June 11, 1935.     G. A. TINNERMAN     2,004,679
FASTENING DEVICE
Filed Jan. 9, 1933
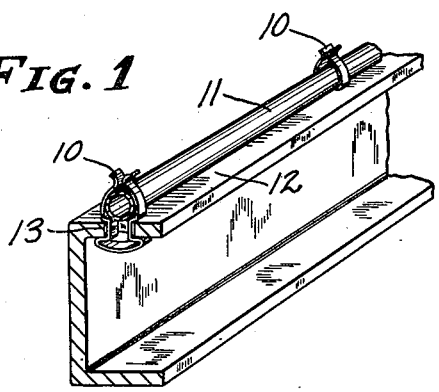
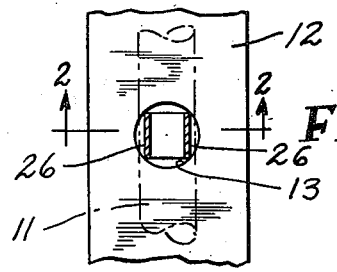
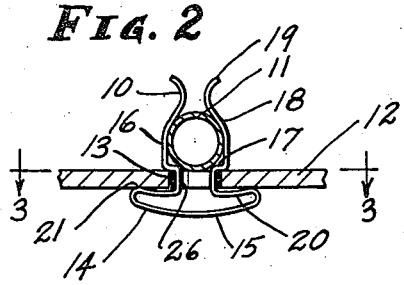
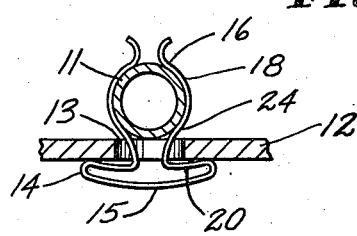
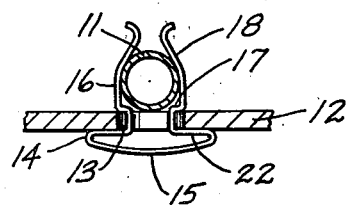
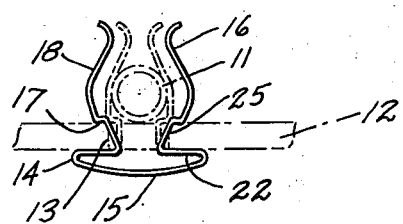
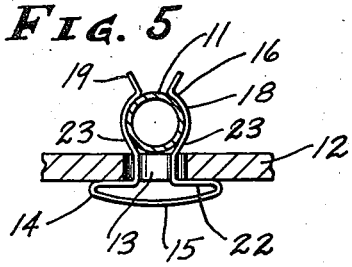
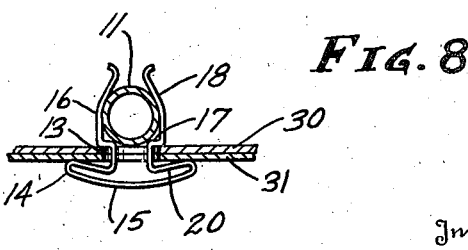
Inventor
George A. Tinnerman
By Bates, Solrick & Teare
Attorneys Patented June 11, 1935

2,004,679

UNITED STATES PATENT OFFICE 2,004,679

FASTENING DEVICE

George A. Tinnerman, Rocky River, Ohio, assignor to Albert H. Tinnerman, Cleveland, Ohio Application January 9, 1933, Serial No. 650,772

1 Claim. (Cl. 24—73)

This invention relates to fastening devices, and particularly to a spring clip which may be used for holding conduits, electrical conductors and the like in place upon a support. This device is designed to take the place of fastening devices using bolts and nuts in connection with metallic clips of various sorts. These prior devices are expensive to manufacture and to assemble, and the nuts are easily loosened when the article is subjected to vibration.

In my copending application, Serial No. 643,981, filed November 23, 1932, I disclosed a spring clip having a head insertable through an opening in a support and having a conduit holding arm or arms located on the side of the support from which the clip was inserted. An object of the present invention is to provide a clip insertable through an opening in a support and having article embracing portions on the side of the support opposite to that from which the clip is inserted. The clip here disclosed derives other advantages from the shape of the head, as herein described.

A further object of my invention is to make a fastener which can be readily snapped into place, and when so positioned will firmly hold an article by spring tension of the clip head.

Still another object of my invention is to provide a fastener which will hold a plurality of panels in place and at the same time will hold a conduit or conductor firmly against one of said panels.

Referring now to the drawing, Fig. 1 is a perspective view of one form of my clip holding a conduit upon a support; Fig. 2 is a section through the device of Fig. 1; Fig. 3 is a sectional view along the line 3—3 of Fig. 2, while Figs. 4 to 8 are further modifications of the invention.

A fastener embodying my invention may be made from a strip of round or flat wire, having resilient characteristics. The fastener may assume various shapes and forms, in accordance with the use for which it is intended, and a variety of such forms is illustrated herewith.

In Fig. 1 the clips 10 are shown extending through openings 13 in a support 12, to hold the conduit 11 upon the support. The clip 10, which is shown more in detail in Fig. 2, comprises a head portion 14, of greater extent than the hole 13, through which the clip is inserted. The head preferably has an arched portion 15 for a purpose presently discussed. The metallic strip is then bent back upon itself, as at 20, following the general contour of the arch 15, and then bent substantially normal to the portions 20, as at 26, to form two arms 16, adapted to extend through the hole 13 in the support 12.

The clip may be formed so that the portions 26 in their normal, unstressed position lie somewhat farther apart than the walls of the opening 13, which contact the portions 26 when the clip is in place. It results from this construction that the portions 26 are constrained between the walls of the opening so that the clip is firmly held in place and will not turn easily. This is an advantage when the clip is used on an article produced on an assembly line, where the clips are inserted in proper position to take a later-assembled conduit.

The arms may be bent away from each other, as at 17 to form shoulders engaging the upper surface of the support. The arms then have converging portions 18 and if desired may be provided with the diverging portions 19 at their free ends to more readily permit the entry of the conduit 11 within the clip. The portions 18 serve a double purpose. On the one hand they engage the walls of the opening in the support to press the arms 16 toward each other, when the clip is inserted in the opening, and on the other hand they bear upon the conduit 11 above its axis, thus pressing the conduit downwardly upon the support. The arms 16 are so constructed that the conduit 11, adapted to be used with this particular clip, forces the arms away from each other, as it enters the fastener, and thereafter the converging portions 18 of the arms press inwardly toward each other and at the same time press the conduit downward toward the support.

The head 14 is so constructed that, in the position shown in Fig. 2, the act of forcing the arms 16 through the opening causes a reaction between the ends 21 of the head against the support, placing an initial stress in the arched portion 15, supplemented by the arched portions 20. The resulting spring tension of the arched head portion on one side of the support holds the shoulders 17 firmly against the opposite side of the support. In the absence of an article between them, the arms 16 may be pressed together and the spring tension in the head will snap the device away from the support.

The head 14 is substantially flat in shape, although in Figs. 1, 2, 3, 6 and 8, I have illustrated it as being slightly arched and this, together with the spring characteristic of the arched portion 15, gives a clip more satisfactory for certain purposes than the clip described in my copending application, Serial No. 643,981. The relatively flat head is easier to push into place in a speedy assembly. The head lies close to the support so that this clip may be used in restricted spaces. The arched arrangement of the head permits the arms 16 to adjust themselves to supports varying somewhat in thickness. Also, the relatively flat head with its ends lying close to the support is not so easily dislodged as is the V-shaped head of the copending application.

The clip shown in Fig. 4 is similar to that in Fig. 2, but the portions 22 of the head are bent not conformable to the arch 15, but horizontally to conform to the flat support 12. The spring action of the head tending to pull the arms 16 back through the opening 13 is not so pronounced, in this modification, as that described in connection with Fig. 2.

The devices shown in Figs. 5 and 6 are similar to those already described, and similar parts are similarly numbered. It will be noted that in place of the shoulder portion 17, sloping portions 23 and 24 have been substituted. The tension created by the spring action of the head 14, as above described, tends to pull the arms 16 downward through the opening in the support 12. This pull, as exerted at the point where the sloping portions 23 and 24 impinge upon the support 12, causes the arms to pinch more tightly against the conduit 11. At the same time the downward pull of the spring tension of the head is not resisted by shoulders, as in Figs. 1–4, but is exerted on the portions 18 of the arms, which draw the conduit firmly toward the support.

In the modification illustrated in Fig. 7, the clip is formed so that before insertion into an opening in a support it normally assumes the position shown in full lines. When the arms 16 are pressed together, and inserted through an opening in a support 12, the clip will take the position shown in broken lines. Portions 25 of the arms which pass through the opening normally tend to diverge at an obtuse angle to the head portions 22, but are pressed together when inserted through the opening, and are held by the walls of the opening in the position shown in broken lines. In this position, the tension of the resilient metal holds the clip tightly in position in the opening, and at the same time the position of the arms 16 is such as to tightly grip the conduit. It results from this arrangement that the arms 16 embrace the conduit with less deformation than occurs with the clip of Fig. 2. I find that clips formed on this principle break less easily than those of Fig. 2, and I believe that such result occurs because of the fact that the spreading of the arms to insert a conduit in the fastener of Fig. 7 bends them toward the normal position, while the same movement in the fastener of Fig. 2 bends the arms away from the normal position. The breakage normally occurs at the shoulders.

Fig. 8 illustrates how the clip of Fig. 2 may be used to retain two panel members or plates 30 and 31, together, while at the same time holding the conduit 11 upon the outer surface of plate 30. The parts are numbered in accordance with the numbering of Fig. 2, and, as there described, the clip is inserted through registering openings 13, so as to create a spring tension in the arched portions 15 and 20 of the head 14. The resulting pull downward upon the shoulder portions 17 impinging upon the plate 30, and counteracted by the head 14 impinging against the plate 31, pulls the two plates firmly together, while at the same time the converging portions 18 of the arms 16 retain the conduit 11 firmly in position upon the outer surface of the plate 30.

I claim:

A snap fastener for holding tubes and the like, comprising an integral strip of resilient metal of uniform width throughout, said strip being bent intermediate its ends to form a head portion greater in extent than an opening in a support through which the fastener is adapted to be passed, said head being adapted to rest against one face of the support, a pair of arms extending from the head and adjacent the midportion thereof, the arms being flared outwardly to provide shoulder portions that are adapted to rest against the opposite face of the support and to receive a tube or similar article, and being then extended inwardly toward each other to embrace the tube, and said arms being flared outwardly again adjacent their free ends to facilitate the admission of a tube.

GEORGE A. TINNERMAN.